United States Patent [19]

George et al.

[11] Patent Number: 4,650,836

[45] Date of Patent: Mar. 17, 1987

[54] LIQUID CRYSTAL POLYMER METHOD AND COMPOSITION

[76] Inventors: Eric R. George, 4103 Pascagoula St., Pascagoula, Miss. 39567; Roger S. Porter, 220 Rolling Ridge Rd., Amherst, Mass. 01002

[21] Appl. No.: 720,201

[22] Filed: Apr. 4, 1985

[51] Int. Cl.$^4$ .................. C08F 20/00; C08G 81/00
[52] U.S. Cl. ....................... 525/444; 252/299.1; 524/293; 524/294; 524/605; 528/176; 528/183; 528/190; 528/192; 528/193; 528/194
[58] Field of Search ............... 528/176, 183, 190, 192, 528/193, 194; 525/444; 524/293, 294, 605; 252/299.1

[56] References Cited

U.S. PATENT DOCUMENTS

| | | | |
|---|---|---|---|
| 3,637,595 | 5/1969 | Cottis et al. | 260/47 C |
| 3,778,410 | 12/1973 | Jackson et al. | 260/17 C |
| 4,225,699 | 9/1980 | Schmidt et al. | 528/324 |
| 4,245,082 | 1/1981 | Irwin | 528/128 |
| 4,256,624 | 3/1981 | Calundann | 260/40 R |
| 4,330,457 | 5/1982 | East et al. | 524/602 |
| 4,412,059 | 10/1983 | Krigbaum et al. | 528/192 |
| 4,451,611 | 5/1984 | Cincotta et al. | 525/51 |
| 4,489,190 | 12/1984 | Froix | 524/539 |
| 4,565,850 | 1/1986 | Prevorsek et al. | 525/425 |

OTHER PUBLICATIONS

Calundann, et al, "Anisotropic Polymers, Their Synthesis and Properties", reprinted from The Robert A. Welch Conferences on Chemical Research (1982).

Blumstein, et al, "Influence of Molecular Weight on Phase Transitions and Alignment of a Thermotropic Nematic Polyester", 17 *Macromolecules*, pp. 177-183 (1954).

Krigbaum, et al, "Thermodynamics of Nematic Phases Formed from Semiflexible Chain Polymers", 16 *Journal of Polymer Science*, pp. 883-894 (1978).

Blumstein, et al, "Nematic and Cholesteric Thermotropic Polyesters with Azoxybenzene Mesogenic Units and Flexible Spacers in the Main Chain", 20 *Journal of Polymer Science*, pp. 877-892 (1982).

Kirk-Othmer, 14 *Encyclopedia of Chemical Technology*, pp. 395-423, John Wiley & Sons, New York.

*Primary Examiner*—Lucille M. Phynes
*Attorney, Agent, or Firm*—Woodrow W. Ban

[57] ABSTRACT

A method for rending melt processable a liquid crystal polymer otherwise not readily processable as a result of an interfering degradation temperature or an elevated viscosity. In the method the liquid crystal polymer is blended with a second, low molecular weight liquid crystal diester to form a miscible mesophase which is typified by a reduced viscosity and or at a lower temperature may be formed into a desired configuration. The low molecular weight liquid crystal may be then transesterified into the polyester to produce a long chain having desirable final liquid crystal polymer properties.

9 Claims, 4 Drawing Figures
}

LIQUID CRYSTAL POLYMER METHOD AND COMPOSITION

FIELD OF THE INVENTION

This invention relates to polymeric liquid crystal materials, and more specifically to methods for processing such polymeric liquid crystal materials. Particularly, this invention relates to methods for processing polymeric liquid crystal materials where a desired temperature and/or viscosity for such processing closely approaches or exceeds a temperature at which the polymeric liquid crystal material substantially degrades.

BACKGROUND OF THE INVENTION

Liquid crystals, highly anisotropic fluids intermediate in character between solids and more conventional isotropic liquids, are possessed of constituent molecules exhibiting some degree of order despite being in a non-solid state within certain ranges of temperature. Liquid crystals are typically organic compounds. Where ordered, an illusion of solid like property is imparted to the liquid crystal, but forces of traction between constituent molecules typically are not sufficiently strong to prevent some flow or other substantial property atypically associated with a solid. Thousands of organic substances and particularly, many polymers exhibit liquid crystallinity.

Typically, a liquid crystal exhibits a solid phase which, at a particular temperature, changes by melting to yield a fluid in which, to some degree, the original molecular order of the solid is retained. Upon a further temperature elevation, a second melting point is reached at which the liquid crystal assumes a more normal or typical isotropic liquid phase. Significant alignment properties between the constituent molecules is generally eliminated by such a second melting. For some liquid crystals, solid-state-resembling intermolecular order may also be at least partially destroyed by the introduction of a solvent into the liquid crystal. Such solvent destroyed liquid crystals are termed lyotropic.

Liquid crystals can demonstrate a variety of phases. Two more common phases are the so-called smectic and nematic. In both phases, molecules of the liquid crystal material tend to demonstrate parallel orientation along long axes of the liquid crystal molecules. Additionally, many smectic liquid crystal forms demonstrate a layering of molecular centers into two dimensional planes or sheets. Because a smectic mesophase tends to be the most solid-like of liquid crystal phase structures, it is more common for processing of liquid crystals to be undertaken in the nematic phase. In many liquid crystals, both smectic and nematic phase behavior are observed with the less ordered nematic phase behavior as a rule occurring at a more elevated temperature than that characterizing the smectic phase behavior in the particular liquid crystal.

Liquid crystals, however, like most materials, pass from a more ordered state to a less ordered state with increasing temperature. So, liquid crystalline materials pass from a solid state to, in many instances, a smectic liquid crystal state and then to a nematic liquid crystal state with increasing temperature. From time to time, depending upon the nature of the liquid crystal material, a mesophase state may be achieved only where the temperature of the particular liquid crystalline material approaches or exceeds a temperature at which the liquid crystalline material begins to decompose.

Where a liquid crystalline material is possessed of a mesophase state over a temperature range that approaches or exceeds the decomposition temperature for the liquid crystalline material, processing of the liquid crystalline material in the mesophase state can become difficult if not impossible. Particularly, nematic state processing may be desirable because of the lower degree of order associated with material in a nematic phase versus a smectic phase liquid crystalline material.

Yet, the introduction of a mere solvent into a liquid crystal material to assist in lowering the degree of order of the liquid crystal material likely and thereby lowering the temperature at which the liquid crystalline material would be processable, may result in the conversion of the liquid crystal material into a lytropic state unsuitable for melt processing. Alternately, introduction of the solvent could destroy liquid crystallinity entirely. In any event where a solvent is included as a processing assistor, any such solvent must, typically, later be removed. Techniques for such removal can interfere with ultimate uses for the liquid crystal material being processed.

In other liquid crystal materials, the temperature range in which the liquid crystal material forms a mesophase may be sufficiently below a degradation temperature for melt processing of the liquid crystal material, but a viscosity associated with the liquid crystal material in the temperature range associated with mesophase behavior may be sufficiently elevated to preclude, effectively, the application of desirable melt processing techniques. For reasons similar to those applicable to a situation where the mesophase behavior occurs in a temperature range insufficiently distinct from the degradation temperature, the addition of a solvent to alter mesophase viscosity characteristics may often be undesirable. A liquid crystalline material having an elevated viscosity while in the mesophase at a desirable processing temperature or a liquid crystal material having a temperature range in which mesophase behavior is demonstrated closely adjacent or above a temperature at which degradation of the liquid crystal material occurs often is found in polymeric liquid crystalline materials and particularly synthetic polymeric liquid crystals.

A method for processing a liquid crystal material having elevated viscosity within a temperature processing range or a temperature range in which the liquid crystal material is processible only so closely adjacent or exceeding a decomposition temperature for the liquid crystal material as to make processing within that temperature range impractical but without necessitating subsequent removal of a solvent from the liquid crystal material being processed could find widespread commercial utility.

DISCLOSURE OF THE INVENTION

The present invention provides a method for reduced viscosity processing of a thermotropic liquid crystal. The method finds particular application where the thermotropic liquid crystal demonstrates mesophase behavior over a temperature range insufficiently below a degradation temperature for the thermotropic liquid crystal to permit desirable processing within the temperature range or where the thermotropic liquid crystal demonstrates an undesirably elevated viscosity in the mesophase substantially hindering mesophase processing. Typically, the thermotropic liquid crystal is a polyester as contemplated within the scope of the instant invention.

In the method of the invention, the first thermotropic liquid crystal is solvated in a second, low molecular weight, liquid crystal having at least di-functional reactivity. This second, low molecular weight liquid crystal includes at least 12 carbon atoms and includes at least two six membered rings joined at either the para or meta positions, and much preferably at the para position. The second liquid crystal must deomonstrate mesophase behavior in a temperature range at least partially co-extensive with the temperature range in which the first liquid crystal displays mesophase behavior. The first and second liquid crystals must be substantially miscible and not substantially co-crystallizable. Preferably the second low molecular weight liquid crystal is a diester of the form:

$$R-R_3-[R_2]-R_4-R_1$$

In the low molecular weight liquid crystalline (LMWLC) diester, R and $R_1$ are each an alkyl of not more than 4 carbon atoms and R may be identical to $R_1$. $R_2$ comprises not less than 12 carbon atoms including at least two six-member aromatic rings, at least two such rings being interconnectably joined by a rigidity promoting linkage having substantial electron conjugating capabilities. The rings joined by such a linkage are joined at either the para or the meta positions. $R_3$, $R_4$ typically are of the form:

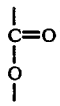

so that the LMWLC diester has the general form:

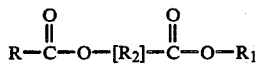

The low molecular weight liquid crystal diester should demonstrate mesophase behavior in a range of temperatures at least partially co-extensive with the range of temperatures in which the thermotropic liquid crystalline polyester demonstrates mesophase behavior. The temperature range for the low molecular weight liquid crystal should include an upper temperature of not less than about 160° C. and preferably, 200° C., and the low molecular weight liquid crystal should be thermally stable in the temperature range. The second liquid crystal should be transreactable into the first liquid crystal.

The first liquid crystal should be substantially miscible in the low molecular weight liquid crystal and the two liquid crystals should be substantially not co-crystalizable in the solid state.

The first and second liquid crystals forming a solution are then heated to a temperature within the co-extensive portion of the temperature ranges in which each display mesophase behavior, and at a minimum to a temperature of at least 200° C. The liquid crystals combined in solution are then formed into a desired shape and the desired shape is cooled to below a temperature at which either of the liquid crystals demonstrates mesophase behavior but above a threshold temperature at which a transreaction occurs between the first and second liquid crystals until the transreaction has been accomplished to a desired extent.

From time to time, transreaction may require the inclusion of an appropriate catalyst.

In preferred embodiments, the first liquid crystal comprises not less than 50% and not more than 95% by weight of the solution of the first liquid crystal and the low molecular weight liquid crystal. Preferably, the linkage joining aromatic 6 member rings in the low molecular weight liquid crystal is selected from a group consisting of:

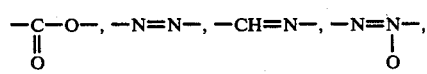

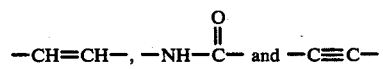

In preferred embodiments, the low molecular weight liquid crystal is a diester of the form:

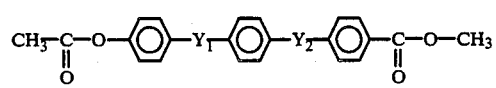

wherein $Y_{1,2}$ is an ester group. In preferred embodiments the first liquid crystal is a thermotropic liquid crystal polyester, a polymer polymerized from a bisphenol, phthalic acid, and a 2,6 dicarboxylic acid monomer in a mole ratio of about 5:4:1.

A blend of the first and second liquid crystals results from the practice of the instant invention which, upon being maintained at elevated temperature sufficient to initiate transreaction between the liquid crystals results in a transreaction product therebetween.

The above and other features and advantages of the invention will become more apparent when considered in light of a description of a preferred emodiment of the invention that follows, forming together with the drawings a part of this specification.

BEST EMBODIMENT OF THE INVENTION

Figure 1:
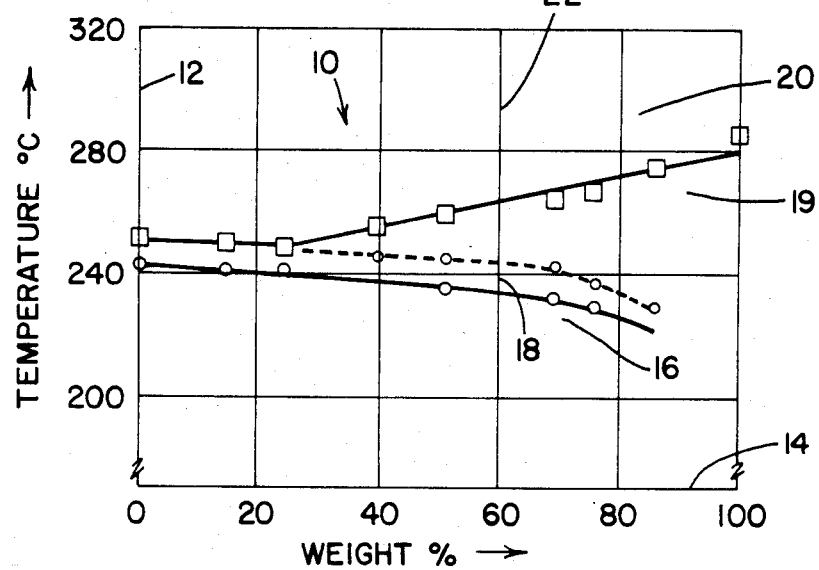
FIG. 1 is a graphical representation of a phase diagram plotting temperature on the axis and weight percent of a first thermotropic liquid crystal polyester on the abcissa.

The present invention provides a method for liquid crystal phase processing of a first, thermotropic, liquid crystal, typically a polyester that demonstrates mesophase behavior over a temperature range but which is possessed of either: a viscosity undesirably elevated at a desirable melt processing temperature, or a polymer chain length and/or rigidity insufficiently desirable (elevated) at an end-use temperature when processable at the desirable temperature. By the term liquid crystal as used herein what is meant is a nonisotropic substance exhibiting birefringence and exhibiting interference patterns in polarized light. By the term "polyester", as used herein, what is meant is a synthetic polymeric material resulting from the polycondensation of dicarboxylic acids with dihydroxy alcohols, but the use of di-acetates in lieu of dihydroxies is contemplated as within the scope of the term "polyester."

The first liquid crystal is typically possessed of an elevated molecular weight of at least about $1 \times 10^3$ and not more than about $1 \times 10^7$. More preferably, this weight is between $5 \times 10^3$ and $1 \times 10^6$. The first liquid crystal includes substantial aromatic character, at least about 80% of carbon atoms present in the first liquid crystal being present in aromatic rings. The first liquid crystal typically is a polyester and terminates in methyl ester, hydroxyl, acid, or acetate groups. In addition to polyesters, other liquid crystalline materials believed suitable for use in practicing the instant invention as a first liquid crystal include polyazomethines such as poly(nitrilo-2 methyl-1,4 phenylene nitrilo-methylidine), and polyalkoxybenzoates such as poly(4-alkoxy 4'-alkoxybenzoates).

The first thermotropic liquid crystal, whether a polyester or another polymer can be of any suitable or conventional nature. Particularly, polymers having an elevated viscosity adjacent a desired processing temperature in the mesophase making processing difficult or impossible at the desired temperature, or an insufficiently elevated rigidity or strength characteristic in the solid state to provide desired strength properties in a final object. Particularly, the instant invention finds utility in processing polyesters containing a 2,6 disubstituted acid monomers polymerized therein of the form:

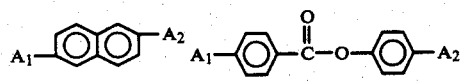

$A_1$, $A_2$ typically are carboxyl, acetate, or hydroxyl and may be identical. By the term mesophase or mesomorphic phase as used herein, what is meant is a state of matter intermediate between a crystalline solid and a normal isotropic liquid and including the so-called nematic and smectic phases or states.

By the term "nematic" as used herein, what is meant is a phase of a liquid crystalline material in the mesomorphic state wherein the liquid crystal material appears to be possessed of a single optical axis, typically orientable in a unitary direction in the presence of an applied magnetic field, appears to be turbid and typically appears to be possessed of mobile thread like structures when viewed between crossed polars in an optical microscope, is relatively readily flowable as compared to more stable states of the liquid crystal material, is possessed of a viscosity relatively lower than viscosities associated with the more stable solid and so-called isotropic state of the liquid crystal material, and typically lacks sharp X-ray diffraction reflections. By the term "thermotropic" as used herein, what is meant is a substance, which, upon heating, transforms from a more stable phase to a less ordered, liquid crystalline phase.

The concept of a mesophase temperature range, as used herein, connotes an extent of temperature variation having a lower and upper limit in which a particular liquid crystalline material demonstrates mesophase behavior. The upper limitation of the temperature range must include a temperature not less than a temperature at which transreactions between the first polymer and another polymer proceed at a significant rate, typically at least 160° C. and more preferably at least 200° C.

The term "degradation temperature", as used herein, refers to a decomposition characteristic of more rigid, generally elevated molecular weight substances such as polymers resulting from exposure of the elevated molecular weight substance to the temperature for a period of time. Decomposition is a fundamental chemical change, typically equatable with pyrolysis and destructive distillation. It is not necessary that decomposition occur simultaneously and immediately to all molecules of a sample of the elevated molecular weight compound upon the sample reaching the decomposition temperature, but rather that at the decomposition temperature, the rate at which decomposition proceeds becomes sufficiently elevated to produce a significant decomposition in the elevated molecular weight compound within a relatively brief time span. The brief time span is occasionally defined in part with reference to a time period required for manipulating the particular elevated molecular weight compound in a process. Typically with increasing temperature, a point is reached at which decomposition begins to proceed rapidly, and the rapidity with which decomposition proceeds increases dramatically with a relatively minor increase in the temperature of the elevated molecular weight compound. The decomposition temperature, therefore, may be a brief range of temperatures having a lower limit at which decomposition begins to proceed at an unacceptable pace and an upper limitation at which decomposition is proceeding at a substantially destructive pace.

By the term "elevated viscosity", what is meant is, a viscosity at which processing, particularly melt processing, becomes impractical or undesirable as a result of stresses or strains or design limitations placed upon equipment employed in processing a liquid crystalline material at least partially arising from the elevated viscosity. So, for example, where because of an elevated viscosity in a material being processed, a drive mechanism must be so beefy and powered by so-powerful a motor that construction and operation of such mixing equipment would be economically impractical, the material being processed is possessed of an elevated viscosity. The present invention then, effectively provides a means for lowering the processing temperature for such first liquid crystals and can thereby additionally facilitate the use of such first polymers in forming blends with or as addivites to other polymeric materials.

Alternately, where the viscosity of the material being processed is such that, for example, the integration of alternate materials into the material being processed to achieve a single phase having homogeneity is rendered difficult or impossible within a commercially reasonable time period, the material is possessed of an unacceptably elevated viscosity. The concept of a polymer having an insufficiently elevated rigidity or an insufficiently elevated chain length as used herein shall refer to desirable strength characteristics as measured employing common mechanistic measurements being less than those desired for a polymeric material comprising a final, finsished article after melt processing.

The first, thermotropic liquid crystal material is solvated in a second, difunctional, low molecular weight liquid crystal in the practice of the instant invention. Where the first liquid crystal is a polyester, the second liquid crystal is a diester. The second, low molecular weight liquid crystal, where a diester, is of the form:

$$R-R_3-[R_2]-R_4-R_1$$

R and $R_1$ are each an alkyl of not more than about four carbon atoms, and typically are methyl or ethyl groups. $R_2$ is a complex of not less than twelve carbon atoms including at least two six-member aromatic carbon rings. At least two such rings are interconnected or interconnectably joined by a rigidity promoting linkage that may be a so-called shift base linkage in non-diesters. Typically the six member rings are phenyl or biphenyl rings but may include substituted phenyl and/or substituted biphenyl rings, so long as any substituting moieties do not protrude substantially from the diester, thereby altering or destroying the rod like character of the diester and likely damaging the liquid crystallinity.

The linkage can be of any suitable or conventional nature tending to promote rigidity between the aromatic rings, but typically is selected from a group consisting of:

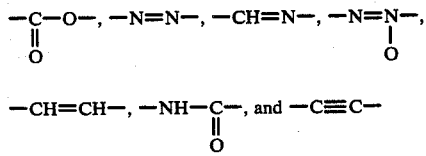

Ester linkages are frequently much preferred as linkages when working with polyesters as first liquid crystals.

It is important that the aromatic rings be joined at the meta or para positions and much preferably the para position to avoid introducing bending or projections associated with the liquid crystal that would interfere with liquid crystalline behavior. A plurality of aromatic rings may be joined consecutively at the meta and para positions to form $R_2$, separated by appropriate or desirable linkages. The linkages joining the aromatic rings need not each be the same, but the second, low molecular weight liquid crystal may include a mixture of appropriate linkages.

The second, low molecular weight diester liquid crystal should display mesophase and preferably nematic behavior in a temperature range at least partially co-extensive with the temperature range in which the first, thermotropic polymeric liquid crystal polyester demonstrates mesophase behavior. Preferably the first liquid crystal displays nematic phase behavior within the co-extensive temperature range. Particularly, the co-extensive portions of the temperature range typically should include a lower co-extensive temperature of not less than about 160° C. and preferably not less than about 200° C.

The second, low molecular weight diester liquid crystal should possess an average molecular weight not exceeding about $5 \times 10^3$ and preferably not exceeding about $1 \times 10^3$.

The first and second liquid crystals should be substantially miscible in the mesophase or at least in the nematic phase, and it is preferable that a mixture of at least 30% by weight of the first liquid crystal in the second liquid crystal should produce a homogeneous single phase. The first and second liquid crystals however should be substantially non co-crystalizable.

The first and second liquid crystals are blended together to form a solution of the first liquid crystal and the second liquid crystal. Typically, the first liquid crystal comprises not less than about 50% and not more than about 95% by weight of the resulting solution and preferably the first liquid crystal comprises not less than about 50% nor more than about 90% by weight of the solution. The solution is then heated until the liquid crystals are within the co-extensive portion of the temperatures ranges in which each displays nematic phase behavior; this temperature is preferably at least as great as a temperature at which transreaction between the liquid crystals becomes significant and not less than about 200° C. Heating may be accomplished in a suitable or conventional manner, but care should be taken to avoid "hot spots" in any physical facilities employed for heating the solution to avoid an opportunity for thermal degradation of either of the liquid crystals forming the solution.

Heated, the solution of first and second liquid crystals frequently displays a temperature range wherein the liquid crystal solution displays mesophase and typically nematic behavior that is significantly lower than a temperature range in which at least one of the liquid crystalline materials displays mesophase and particularly nematic phase behavior in the pure state. Additionally, the nematic phase of the solution typically is significantly less viscous than the corresponding mesophase of at least one of the liquid crystalline materials in a pure-state. For those situations wherein one of the liquid crystals forming the solution is otherwise excessively viscous melt processing in solution can ease handling difficulties.

In one preferred embodiment, the second, liquid crystal is a diester of the form:

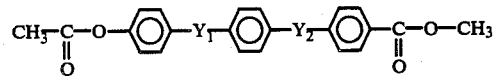

wherein Y is a rigidity promoting linkage as set forth herein and preferably is an ester group. $Y_1$ and $Y_2$ need not be identical linkages.

Heating of the solution of liquid crystals promotes intimate co-mixing of the two liquid crystals to form a single homogenous phase or true solution and thereby facilitates subsequent processing. Once the solution has been raised to a particular desired temperature, the solution can be formed into a desired structural configuration and is then cooled.

Cooling should be continued until the solution reaches a temperature below which either the first or second liquid crystal demonstrates nematic phase behavior. In one preferred alternate the temperature to which the solution is cooled should not, however, be to a temperature below a threshold temperature at which the transreaction occurs between the first and second liquid crystals. Once cooled, the solution of liquid crystals should be maintained above the threshold temperature for transreaction until transreaction between the liquid crystals has been accomplished to a desired extent. In another equally preferred alternate, the solution after being formed is cooled to below a threshold temperature for transreaction only to be subsequently reheated to a temperature at or in excess of a temperature sufficient to sustain a transreaction and maintained at an elevated temperature until transreaction is completed.

By transreaction what is meant is a reaction either between end groups of the first and second liquid crystals or other interpolymer reactions whereby one of the first and second liquid crystals reactively adds to the other possibly causing a shortening of chain length for the other. Where the first and second liquid crystals are a polyester and a diester respectively, the transreaction is termed transesterification which term is meant to include intermolecular alcoholysis, intermolecular acidolysis and conventional transesterification.

It is believed that where initial chain shortening accompanies the transreaction, such chain shortening may contribute to a lower viscosity in the solution of the first and second liquid crystals. However, regardless of the existence of an initial chain shortening phenomenon, with judicious selection of the second liquid crystal, with continued transreaction a larger chained liquid crystal polymer can result than either of the first and second liquid crystals prior to forming the solution. With continued transreaction and chain consolidation, a final object made from the solution of first and second liquid crystals can result formed of a transreaction polymeric product of the first and second liquid crystals and characterized typically by greater rigidity and chain length than characterized either of the first and second liquid crystals in the pure state. Where the first liquid crystal is a polyester and the second liquid crystal a diester, it would appear that a temperature of at least 160° C. and preferably 200° C. is necessary to initiate and sustain transestrification.

The formation of a final liquid crystal polymer having, particularly, elevated molecular chain length can be fostered where the first and second liquid crystals are polyesters and diesters respectfully by the selection of stoichiometrically balanced second liquid crystals. By stoichiometrically balanced what is meant is a balance between hydroxyl and acid forming groups within the liquid crystal. For example the structure:

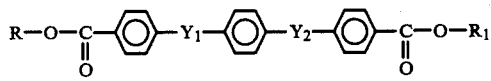

would tend to produce an excess of acid groups whereas the structure:

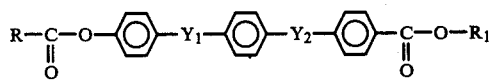

would tend to produce a balance of acid and hydroxyl grops upon polymer cleavage at the ester groups. $Y_1$, $Y_2$=an ester group. Typically also, the number of internal linkages, $Y_1$, $Y_2$ is an even number in second liquid crystals.

The transesterification reaction is believed to require a threshold temperature of at least 160° to sustain transesterification. It is believed that a temperature of approximately 200° C. may be necessary simply for initiation of the transesterification reaction. However, the inclusion of suitable catalysts can change these temperature limits generally to lower temperatures.

Transesterification between a first, thermotropic liquid crystal polyester and a second, liquid crystal diester typically proceeds at a relatively measured pace; therefore, a significant alteration to the physical and chemical characteristics of the solution during most processing schemes to form structural configurations should not occur. Depending upon the nature of the first and second liquid crystal materials forming the solution, it may be desirable, from time to time, to include a transreaction catalyst in the solution. For a first liquid crystal polyester and a second liquid crystal diester transesterification catalysts are well known in the art and any suitable or conventional such catalyst will suffice. It is important that the catalyst being introduced for promoting transreaction not produce too elevated a transreaction rate that would cause significant and undesirable changes to the chemical or physical nature of the solution during processing in the liquid crystal state prior to forming a desired structural configuration.

EXAMPLE 1

A first liquid crystalline polyester formed by the copolymerization of bisphenol-E diacetate, isophthalic acid, and 2,6-naphthalene dicarboxylic acid monomers in a ratio of 5:4:1 and having an inherent viscosity of 0.43 to 1.0 dl/g and an equivalent weight of 5000 to 20,000 was blended with a low molecular weight liquid crystal diester to form a solution. The first liquid crystal polyester had repetitive units of the form:

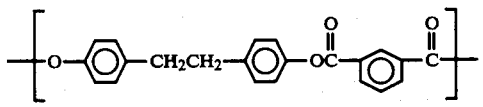

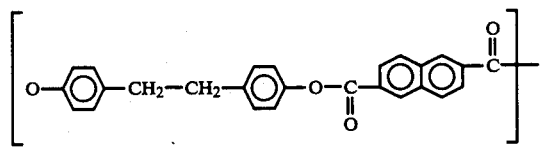

with the 2,6-naphthalene moiety being possessed of a 20% acid equivalent. Terminal groups for the thermotropic first liquid crystal polyester were acetate and acid groups.

The second low molecular weight liquid crystal was a diester of the form:

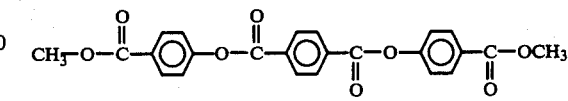

The thermotropic liquid crystalline polyester and the low molecular weight liquid crystal diester were formed into a solution of 75-85 wt % of the former by heating appropriate proportions of each together for four hours at 80° C.-120° C. in a solvent comprising 60% phenol and 40% 1,1,2,2, tetrachloroethane by weight followed by co-precipitation into methanol. The co-precipitate was filtered, rinsed with warm methanol and refluxed in methanol for five hours. The coprecipitate was again rinsed with warm methanol and was vacuum dried at 100° C. for 48 hours.

Separately, phase transitions were determined for each of the first and second liquid crystalline materials employing differential scanning calorimetry utilizing a Perkin Elmer ® DSC-2 machine having a thermal analysis data station and by visual examination employing a Zeiss ® polarizing microscope including a Valley Forge ® variable temperature programmer and by a Statten ® II X-ray diffraction apparatus. Heating rates during differential scanning calorimetry measurements were 10° C. per minute. The first liquid crystal polyester was determined to demonstrate nematic phase behavior at 284° C.; a transition from nematic phase to isotropic phase was found to exceed the thermal degradation temperature for the polyester. For the second, low molecular weight liquid crystal diester, a smectic B phase was found to develop at 233° C. and a nematic phase was found to develop at 248° C.

X-ray diffraction analysis of the low molecular weight liquid crystal diester was performed employed a Statton ® camera employing CuKα radiation, nickel filtered. Standard flat film photographic techniques were employed using a sample-to-film distance of 51.55 millimeters. While differential scanning calorimetry had indicated that a phase transition to the nematic phase, which began at 248° C. was complete by 250° C. with a Schlieren texture forming at 254° C., X-ray defraction, however, indicated a layered structure within the nematic state persisting to 263° C. This layered structure was believed evidence of a cybotactic or transient molecular organization nematic-phase which may have significance relating to miscibility of the low molecular weight liquid crystal diester with the thermotropic liquid crystal polyester.

Referring to FIG. 1, a phase diagram 10 is shown plotting temperature in Celsius on an axis 12 and weight percent of the first liquid crystal polester of Example 1 on abcissa 14 during heating at 10° C./minute. With increasing temperature, a zone 16 exists in which the thermotropic liquid crystal polyester and the low molecular weight liquid crystal diester of Example 1 exist as separate crystals. Another zone 18 is characterized by smectic phase behavior by the low molecular weight liquid crystal diester with the first, thermotropic liquid crystal polyester remaining crystalline. A zone 19 is similar to the zone 18 but the second liquid crystal is present in nematic phase. Lastly, a zone of 20 of mixed nematic phase behavior indicates a true solution. A further zone 22 represents a temperature for which the particular material thermally degrades.

Figure 2:
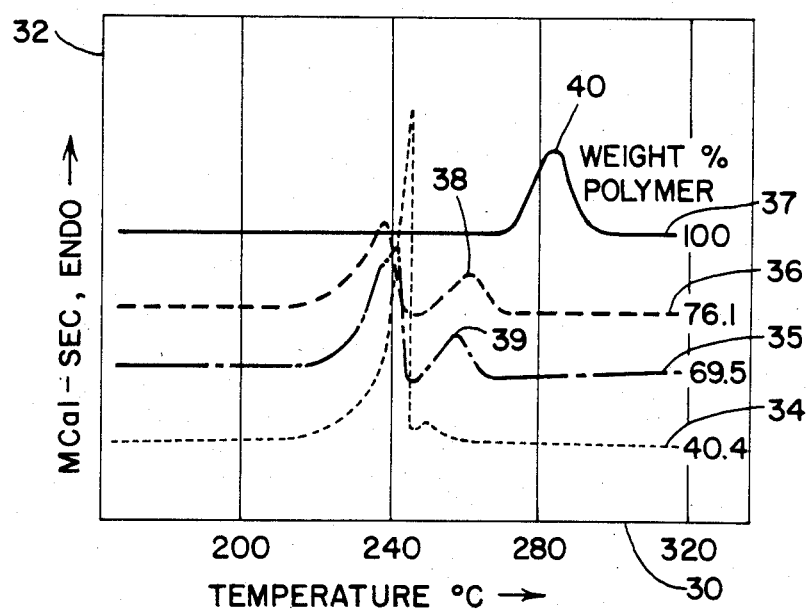
FIG. 2 is a graphical representation of a plurality of thermograms plotting MCal-sec (endothermic) on the axis versus temperature on the abcissa for a plurality of solutions of first and second liquid crystal polymers.

Referring to the drawings, FIG. 2 is a graphical depiction of a relationship between temperature in degree Celsius plotted on the abcissa 30 and thermal imput to a calorimeter plotted on the axis 32. A plurality of curves 34, 35, 36, 37, represent a percentage of low molecular weight liquid crystal diester in a blend of the low molecular liquid crystal diester with, the first liquid crystal polyester of Example 1 as set forth adjacent each curve. The percentages are weight percentages. It may be seen that each of the curves 34, 35, 36 display a dual peak which is believed to represent a solvation process for the low molecular weight liquid crystal diesters in the cybotactic form followed by a conversion to true nematic phase and full solvation of the first liquid crystal polyester in the low molecular weight liquid crystal diester; that is a co-mesophase evolves from the nematic phase of the first liquid crystal polyester and the cybotactic nematic phase of the low molecular weight liquid crystal diester.

Referring to FIG. 2, it may be seen that peaks 38, 39 indicating a transition to the nematic phase behavior represent approximately a 20° C. depression in the achievement of nematic phase behavior when compared to peak 40 of the pure-state low molecular weight liquid crystal of the liquid crystal curve 37.

The achievement of an eutectic type mixture of the first and second liquid crystals is believed important to the achievement of a mesophase and particularly a nematic phase for the solution of the first and second liquid crystals. By eutectic type what is meant is that the first and second liquid crystals should form separate and distinct crystal structures in the solid state and form a mixed miscible liquid phase. The first and second liquid crystals may, however, be semicrystalized in the solid state however. Portions 41, 42 of the curves 34, 35 represent the heat of the excess component, here the first liquid crystal.

Figure 3:
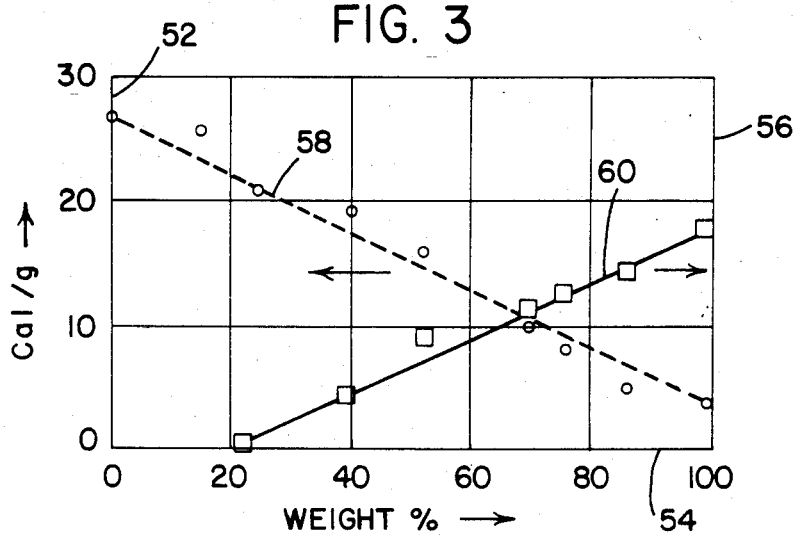
FIG. 3 is a graphical representation of temperature versus temperature heat of transition and heat of excess component.

Referring to the drawings, FIG. 3 is a graphical representation of total heat of transition in calories/gram plotted on an axis 52 versue weight percent of the first liquid crystal plotted on an abcissa 54 and the heat of the excess component plotted in calories per gram on an axis 56 for the first liquid crystal of Example 1. The curve 58 should be read against the axis 52; the curve 60 should be read against the axis 56. The curve 60 reflects a eutectic at about 24% by weight of the first liquid crystal of Example 1.

It is believed that transesterification between the first and second liquid crystals proceeds by two competing reactions, one being known as an end group reaction as follows:

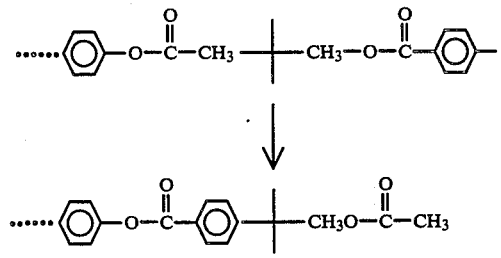

The competeting reaction is an exchange reaction believed to proceed as follows:

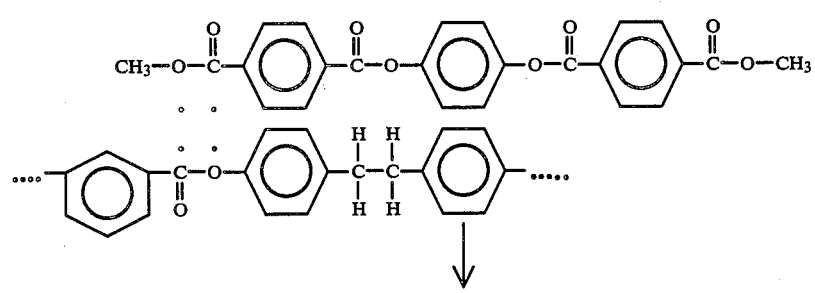

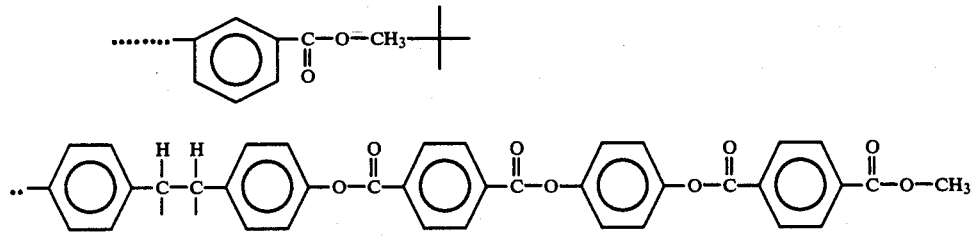

The exchange reaction is believed to dominate, and may be enhanced by introducing into the solution of liquid crystal materials a transreaction (transesterification) catalyst such as a suitable or conventional polyester catalyst, i.e. p-toluene sulfonic acid or sodium acetate. It is desirable that the transesterifiction reaction proceed relatively slowly so that formation of desired structural configurations of the blended liquid crystal materials can be achieved before an elevated viscosity associated with a transesterified blend results.

Blends of the first ano second liquid crystals were subjected to testing to determine the extent to which any transreaction had occurred between the first and second liquid crystals. The results of one such evaluation are presented in Table I.

mic) plotted on an axis 72. A plurality of curves 74, 75, 76, 77 characterize a blend of first liquid crystal polymer in second liquid crystal polymer as set forth in Example 1 wherein the first liquid crystal polymer comprises 76% by weight of the blend and the first liquid crystal polymer is possessed of an intrinsic viscosity of 1.0 d/gr. The curve 77 represents a zero period of reaction; the curve 76 represents a three hour reaction period; the curve 75 represents a five hour reacion; the curve 74 represents a seven hour reaction period.

In the curve 77, a hump 78 representing the glass transition of the unreacted first liquid crystal polymer blend disappears substantially with further reaction as shown on the curve 76. The $T_g$ reappears in the curves 75, 74 as evidence that the molecular weight of the

TABLE I

Temperature and Heat of Transition Data for Unreacted Blends and Reacted Blends (220° C.) of Example I

| Reaction Time (hrs.) | Intrinsic Viscosity (Pure Polymer) First Liquid Crystal | Wt % First Liquid Crystal Inblend | $T_g^a$ (K) | $T_1^b$ (K) | $H_1^b$ cal g | $T_2^c$ (K) | $H_2^c$ cal g | $H_{tot}$ cal g |
|---|---|---|---|---|---|---|---|---|
| 3 | 1.0 | 76 | 370 | — | — | 509 | 3.3 | 3.3 |
| 5 | 1.0 | 76 | 400 | — | — | 555 | 3.4 | 3.4 |
| 1.5 | 1.0 | 86 | — | 480 | 1.4 | 552 | 2.2 | 3.6 |
| 5 | 1.0 | 86 | — | 491 | 1.1 | 555 | 2.9 | 4.0 |
| 0 | 1.0 | 100 | 400 | — | — | 555 | — | 3.6 |
| 0 | 1.0 | 86 | 400 | 504 | 2.1 | 544 | 2.7 | 4.4 |
| 0 | 1.0 | 76 | 400 | 508 | 5.3 | 536 | 2.4 | 7.7 |
| 3 | 0.67 | 75 | 380 | 502 | 8.9 | 549 | 0.4 | 9.3 |
| 5 | 0.67 | 75 | 380 | 492 | 3.0 | 548 | 0.5 | 3.5 |
| 3 | 0.67 | 84 | 375 | 494 | 6.2 | 534 | 3.7 | 9.9 |
| 5 | 0.67 | 84 | 375 | 479 | 1.9 | 519 | 3.2 | 5.1 |
| 0 | 0.67 | 100 | 388 | — | — | 555 | — | 3.8 |
| 0 | 0.67 | 84 | 387 | 499 | 3.8 | 545 | 4.7 | 8.5 |
| 0 | 0.67 | 78 | 390 | 509 | 6.7 | 540 | 3.7 | 10.3 |
| 3 | 0.43 | 75 | — | 504 | — | 520 | — | 8.2 |
| 5 | 0.43 | 75 | — | 505 | — | 519 | — | 8.9 |
| 3 | 0.43 | 85 | 360 | 485 | 2.0 | 518 | 2.4 | 4.4 |
| 5 | 0.43 | 85 | 370 | 434 | 1.9 | 517 | 3.9 | 5.8 |
| 0 | 0.43 | 100 | 390 | — | — | 555 | — | 3.9 |
| 0 | 0.43 | 85 | 385 | 496 | 3.6 | 540 | 5.2 | 8.9 |
| 0 | 0.43 | 75 | 390 | 507 | 7.8 | 536 | 4.7 | 12.5 |

$^a T_g$ - Glass transition temperature estimated by differential scanning calorimetry (10°/min)
$^b T_1$ and $H_1$ - temperature and heat of transition of the eutectic and crystal smectic phase transition
$^c T_2$ and $H_2$ - temperature and heat of transition of the crystal-nematic phase transition for excess first liquid crystal Particularly in Table I, the entry under $T_2$ reflects the effect of transreaction between the first and second liquid crystals. Increases in the temperature T2 with reaction time indicate the polymer. Mixture being characterized by increasingly more elevated chain lengths with the passage of time. It should be noted that for the first liquid crystal polymer having an intrinsic viscosity of 1.0, a transreaction catalyst was included in the blend of first and second liquid crystal polymers. For the remaining runs of first liquid crystal, that is the entries under 0.67 and 0.43 intrinsic viscosity, no transreaction catalyst was included.

Figure 4:
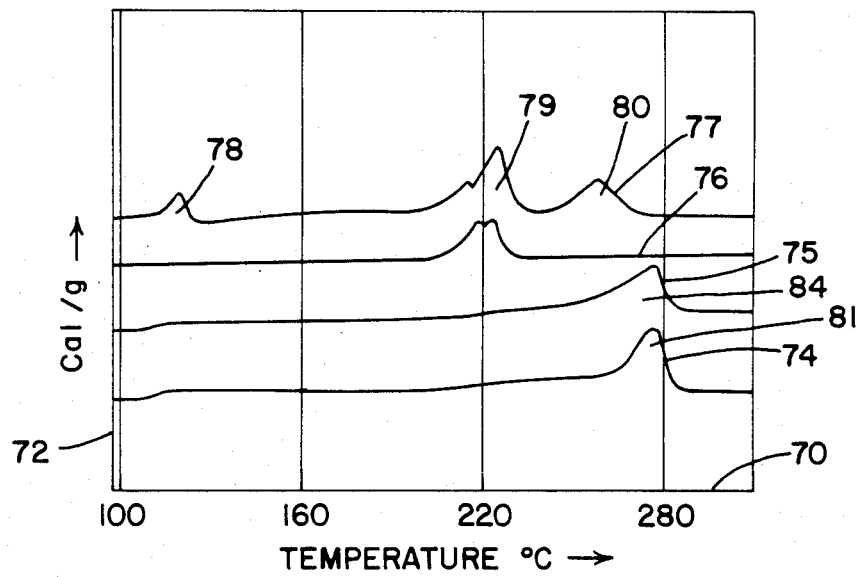
FIG. 4 is a graphical representation of temperature and endothermic heat input for a particular blend of first and second liquid crystals according to the invention.

Referring to the drawings, FIG. 4 is a graphical representation of temperature plotted on an abcissa 70 in degrees Centigrade, versus calories per gram (endothersystem increases following an initial decrease as shown of the curve 76 where the $T_g$ disappears. With reaction time, as shown in curve 76, the heat of excess component curve 80 disappears. In the curve 74, 75, a melting point curve 81 is visible indicating a rebuilding of the molecular weight of the first liquid crystal polymer to a point approaching or exceeding the molecular weight of the first liquid crystal polymer prior to formation of the blend of Example 1.

Selective blends of the polymers of Example 1 were subjected to thermogravimetric analysis to determine the temperature of first five percent weight loss. The results are displayed in Table II. It may be seen by the temperature of the first five percent weight loss in Table II that, with reaction time, whereby the molecular weight of the first liquid crystal is believed to be rebuilt, with the passage of reaction time the temperature of five percent weight loss increases indicating the rebuilding of the molecular weight.

TABLE II

Temperature of First 5 wt % Loss by TGA for Blends of Example I

| Reaction Time (hrs.) | Wt % First Liquid Crystal Polymer | Intrinsic Viscosity First Liquid Crystal | Intrinsic Viscosity (Blend) | Temp. (°C.) 5% Wt Loss |
|---|---|---|---|---|
| — | 100% | 1.0 | 1.05 | 425° |
| — | 0% | — | — | 291° |
| 0 | 76 | 1.0 | 0.74 | 330° |
| 5 | 76 | 1.0 | insoluble | 455° |
| — | 100% | 0.43 | 0.43 | 375° |
| 0 | 75 | 0.43 | 0.34 | 332° |
| 3 | 75 | 0.43 | 0.25 | 337° |
| 5 | 75 | 0.43 | 0.30 | 343° |

Blends of the first and second liquid crystals of Example 1 were permitted to transreact for 0, 3, and 5 hours and the intrinsic viscosity of the blends was measured at the ends of the respective time period. The results are displayed in Table III.

TABLE III

Inherent Viscosities* for Reacted Blends of First Liquid Crystal Polymer with Second Liquid Crystal, Example I

| Reaction Time (hrs.) | Wt % First Liquid Crystal Polymer | Intrinsic Viscosity First Liquid Crystal Polymer | Intrinsic Viscosity (Blend) |
|---|---|---|---|
| 0 | 75 | 0.67 | 0.51 |
| 3 | 75 | 0.67 | 0.16 |
| 5 | 75 | 0.67 | 0.36 |
| 0 | 84 | 0.67 | 0.58 |
| 3 | 84 | 0.67 | 0.22 |
| 5 | 84 | 0.67 | 0.38 |
| 0 | 75 | 0.43 | 0.34 |
| 3 | 75 | 0.43 | 0.25 |
| 5 | 75 | 0.43 | 0.30 |
| 0 | 85 | 0.43 | 0.37 |
| 3 | 85 | 0.43 | 0.68 |
| 5 | 85 | 0.43 | 0.47 |

*intrinsic viscosity measured at 25° C. at concentration of 0.1 g/cc in 60/40 phenol-1,1,2,2 tetrachloroethane solvent It is evident, from the intrinsic viscosities of blends displayed in Table III that after an initial decrease in intrinsic viscosity, the viscosity generally builds indicating a reconsolidation of the first liquid crystal polymer and an increase in molecular weight thereof.

Accordingly, the existance of an effective transreaction between the first and second liquid crystal polymers that requires some not insignificant time period to accomplish allows for a rebuilding of the structural strength of the first liquid crystal polymer by incorporation of and transreaction with the second liquid crystal polymer following formation of the blend. Lower viscosities associated with the blended liquid crystals permit easier handling, particularly in melt processing apparatus. Subsequent rebuilding of the intrinsic viscosity present in the rebuilding of the molecular weight of the first liquid crystal polymer permits utilization of the blends of the instant invention to produce objects requiring elevated molecular weights and substantial physical strength characteristics. Depending upon the selection of the second liquid crystal, a substantial, preferably parasubstituted, aromatic character can be introduced into the first liquid crystal by transreaction.

The instant invention finds particular utility in the processing of so-called wholly aromatic copolyesters and those having a substantially elevated degree of aromaticity. These highly aromatic polyesters, while exhibiting desirable tensile properties are not generally readily melt-spinable or injection moldable for forming desired configurations. The process of the instant invention provides for forming a structural configuration with a polymer having, through transesterification, extended chain length and elevated aromaticity.

While a preferred embodiment of the invention has been shown and describe in detail, it should be apparent that various modifications and additions may be made thereto without departing from the scope of the claims that follow.

What is claimed is:

1. A method for processing in mesophase a first thermotropic liquid crystal polyester demonstrating liquid crystal behavior over a temperature range comprising the steps of:

selecting a second, low molecular weight liquid crystal having at least di-functional reactivity, having a molecular weight of less than about $5 \times 10^3$, and having not less than 12 carbon atoms including at least two 6-member aromatic rings with at least 2 such rings being interconnectably joined to provide liquid crystal character, the rings being joined at one of the para and meta positions, the second liquid crystal demonstrating mesophase behavior in a temperature range at least partially co-extensive with the first liquid crystal temperature range, the first liquid crystal being substantially miscibly in the second liquid crystal and the first and second liquid crystals being not substantially co-crystalizible;

forming a substantially miscible system of the first liquid crystal in the second liquid crystal whereby the second liquid crystal constitutes at least about 5% but not more than 50% by weight of the substantially miscible system;

adjusting the temperature of the liquid crystals to be within the co-extensive portion of the temperature ranges;

forming the substantially miscible system into a desired configuration; and cooling the formed configuration to below a temperature at which either of the first and second liquid crystals demonstrates the liquid crystal behavior but maintaining the configuration above a threshold temperature at which transreaction occurs between the first and second liquid crystals until transreaction has been accomplished to a desired extent.

2. The method of claim 1 including the step of adding a transreaction catalyst.

3. A method for processing in mesophase a first thermotropic liquid crystal polymeric polyester demonstrating liquid crystal behavior over a temperature range and having an undesirably elevated viscosity at a desired processing temperature within the temperature range; the first liquid crystal being polymerized from at least one aromatic diacetate monomer and at least one aromatic carboxylic acid monomer, comprising the steps of:

selecting a second, low molecular weight diester liquid crystal having a molecular weight of not more than about $5 \times 10^3$ of the form:

$$R-R_3-[R_2]-R_4-R_1$$

wherein R and $R_1$ are each an alkyl of not more than four carbon atoms and $R_2$ comprises not less than 12 carbon atoms including at least two 6-member aromatic rings at least 2 such rings being interconnectably joined by a rigidity promoting linkage selected from a group consisting:

$$-\overset{O}{\underset{\|}{C}}-NH-,\ -\overset{O}{\underset{\|}{C}}-O-,\ -N=N-,\ -CH=N-,$$

$$-\overset{O}{\underset{\|}{N}}=N-,\ -CH=CH-,\text{ and }-C\equiv C-$$

the rings being joined employing the linkage at one of the para and meta positions, the $R_3$, and $R_4$ being of the form:

$$-O-\underset{\|}{C}=O$$

the second liquid crystal demonstrating liquid crystal behavior in a temperature range at least partially co-extensive with the first liquid crystal temperature range and including an upper temperature of not less than 160° C., the first liquid crystal being substantially miscible in the second liquid crystal and the first and second liquid crystals being not substantially co-crystalizible;

forming a solution of the first liquid crystal in the second liquid crystal, the first liquid crystal comprising not less than 50 percent and not more than about 95 percent by weight of the solution;

adjusting the temperature of the liquid crystals to be within the co-extensive portion of the nematic temperature ranges and at least 200° C.;

forming the solution into a desired configuration; and cooling the formed configuration to below a temperature at which either of the first and second liquid crystals demonstrates the shape nematic behavior but maintaining above about 180° C. until transesterification has been accomplished to a desired extent between the liquid crystals.

4. The method of claim 3 including the step of adding a transesterification catalyst.

5. The method of one of claims 3 or 4, the second liquid crystal being of the form:

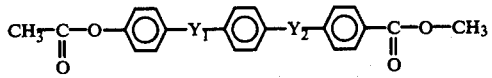

wherein Y is a linkage.

6. The method of claim 5, the first liquid crystal being a polymer of a bisphenol, a phthalic acid and a 2,6,dicarboxylic acid in a mole ratio of about 5:4:1, and $Y_1$ and $Y_2$ in the second liquid crystal being

7. A blend comprising: a first thermotropic liquid crystal polymeric polyester demonstrating liquid crystal behavior over a temperature range polymerized from at least one aromatic diacetate monomer and at least one aromatic carboxylic acid monomer; and a second, low molecular weight diester liquid crystal having a molecular weight of not more than about $5 \times 10^3$, of the form:

$$R-R_3-[R_2]-R_4-R_1$$

wherein R and $R_1$ are each an alkyl of not more than four carbon atoms and $R_2$ comprises not less than 12 carbon atoms including at least two 6-member aromatic rings at least 2 such rings being interconnectably joined by a rigidity promoting linkage selected from a group consisting of:

$$-\overset{O}{\underset{\|}{C}}-NH-,\ -\overset{O}{\underset{\|}{C}}-O-,\ -N=N-,\ -CH=N-,$$

$$-\overset{O}{\underset{\|}{N}}=N-,\ -CH=CH-,\text{ and }-C\equiv C-$$

the rings being joined employing the linkage at one of the para and meta positions, the $R_3$ and $R_4$ being of the form:

$$-O-\underset{\|}{C}=O$$

the second liquid crystal demonstrating liquid crystal behavior in a temperature range at least partially co-extensive with the first liquid crystal temperature range and including an upper temperature of not less than 160° C.; the first liquid crystal being present in the blend in a quantity of not more than 95% nor less than about 50% by weight of the blend.

8. A transreaction product of the blend of claim 7.

9. The blend of claim 8, the upper temperature being not less than 200° C.

* * * * *